US012198515B2

(12) United States Patent
Kronish et al.

(10) Patent No.: US 12,198,515 B2
(45) Date of Patent: Jan. 14, 2025

(54) LIGHT SWITCH SYSTEMS CONFIGURED TO RESPOND TO GUNFIRE AND METHODS OF USE

(71) Applicants: Ari Kronish, Englewood, CO (US); Martin Wright, Boulder, CO (US)

(72) Inventors: Ari Kronish, Englewood, CO (US); Martin Wright, Boulder, CO (US)

( * ) Notice: Subject to any disclaimer, the term of this patent is extended or adjusted under 35 U.S.C. 154(b) by 0 days.

(21) Appl. No.: 18/508,062

(22) Filed: Nov. 13, 2023

(65) Prior Publication Data

US 2024/0161590 A1 May 16, 2024

Related U.S. Application Data

(60) Provisional application No. 63/424,730, filed on Nov. 11, 2022.

(51) Int. Cl.
*G08B 13/16* (2006.01)
*G06V 20/40* (2022.01)
*G06V 20/52* (2022.01)
*G08B 25/00* (2006.01)
*H05B 47/12* (2020.01)
*H05B 47/125* (2020.01)
(Continued)

(52) U.S. Cl.
CPC ......... *G08B 13/1672* (2013.01); *G06V 20/44* (2022.01); *G06V 20/52* (2022.01); *G08B 25/007* (2013.01); *H05B 47/12* (2020.01); *H05B 47/125* (2020.01); *H05B 47/13* (2020.01); *F41H 11/00* (2013.01)

(58) Field of Classification Search
CPC .. G08B 13/1672; G08B 25/007; G06V 20/44; G06V 20/52; H05B 47/12; H05B 47/125; H05B 47/13; F41H 11/00
See application file for complete search history.

(56) References Cited

U.S. PATENT DOCUMENTS 9,652,975 B1 * 5/2017 Riley ..................... G08B 1/08
10,930,125 B1 * 2/2021 Alonzo, III ............ G08B 21/10
(Continued)

FOREIGN PATENT DOCUMENTS

| KR | 10-2009-0009479 A | 1/2009 |
| KR | 10-2015-0056983 A | 5/2015 |
| KR | 10-2022-0022551 A | 2/2022 |

OTHER PUBLICATIONS

"International Search Report and Written Opinion of the International Searching Authority," issued in connection with Int'l Appl. No. PCT/US2023/079548, dated Mar. 11, 2024 (11 pages).

*Primary Examiner* — Nay Tun
(74) *Attorney, Agent, or Firm* — Holland & Hart LLP

(57) ABSTRACT

The disclosed technology includes gunfire response systems and methods to detect gunfire, turn off lights when gunfire is detected, disable the lights from being switched on, and notify emergency responders. Such systems can help minimize ensuing risk following a shooting event by limiting the vision of a person who produced the gunfire. In some embodiments, the light switch system comprises one or more sensors. In some specific embodiments, the sensors include a microphone, infrared sensor, and optionally a camera. In some specific embodiments, the system is configured to detect gunfire sound, detect a type of gun that produced gunfire, and count of a number of shots of the gunfire.

12 Claims, 8 Drawing Sheets

(51) Int. Cl.
*H05B 47/13* (2020.01)
*F41H 11/00* (2006.01)

(56) References Cited

U.S. PATENT DOCUMENTS

| | | | |
|---|---|---|---|
| 11,792,520 B1 * | 10/2023 | Fitzpatrick | H04N 7/188 |
| | | | 348/143 |
| 2008/0224862 A1 * | 9/2008 | Cirker | G08B 13/19686 |
| | | | 340/540 |
| 2010/0244706 A1 | 9/2010 | Steiner et al. | |
| 2015/0070166 A1 * | 3/2015 | Boyden | G08B 25/012 |
| | | | 340/540 |
| 2015/0137986 A1 | 5/2015 | Kang et al. | |
| 2016/0012697 A1 | 1/2016 | Batchelder et al. | |
| 2016/0232774 A1 * | 8/2016 | Noland | G08B 25/10 |
| 2017/0086192 A1 * | 3/2017 | Bohlander | H04W 4/02 |
| 2017/0301220 A1 * | 10/2017 | Jarrell | H04W 4/70 |
| 2019/0295207 A1 * | 9/2019 | Day | G08B 5/38 |
| 2020/0226892 A1 * | 7/2020 | Coles | G08B 5/38 |
| 2020/0334961 A1 * | 10/2020 | Kaindl | G01S 13/886 |
| 2020/0389330 A1 * | 12/2020 | Longardner | H02J 7/0045 |
| 2021/0071855 A1 * | 3/2021 | Pan | H05B 47/165 |
| 2021/0158685 A1 * | 5/2021 | Bernotas | G08B 17/12 |
| 2021/0366267 A1 * | 11/2021 | Connell, II | G08B 29/24 |
| 2023/0070772 A1 * | 3/2023 | Bingham | G08B 19/005 |

* cited by examiner

LIGHT SWITCH SYSTEMS CONFIGURED TO RESPOND TO GUNFIRE AND METHODS OF USE

CROSS-REFERENCE TO RELATED APPLICATION

This application claims the benefit of U.S. Provisional Patent Application No. 63/324,730, entitled "Light Switch Systems Configured to Respond to Gunfire and Methods of Use," filed on Nov. 11, 2022, which is specifically incorporated by reference for all it discloses and teaches.

BACKGROUND

Systems and methods to improve safety in public places are continually evolving. Innovation meets multiple needs such as improved detection of threats, improved response to threats, improved dissuasion of bad actors, and improved assurance to the public. Systems and methods to minimize risk are desirable.

SUMMARY

Various aspects of this disclosure relate to light switch systems that are configured to detect gunfire, switch off lights when gunfire is identified, disable the lights from being switched on, and notify emergency responders such as police, local authorities, and security personnel. Such systems can help minimize ensuing risk following a shooting event by limiting the vision of a person who produced the gunfire. Such systems are particularly effective in buildings with rooms that lack windows such as schools.

In some embodiments, a light switch system configured to respond to gunfire includes a base unit. The base unit includes a light switch housing configured for installation in a wall of a building, an actuator configured to switch one or more lights on and off, and an actuator circuit configured to transmit actuator signals from the actuator. The system may also include one or more sensors to detect one or both of (i) gunfire light and other light and (ii) gunfire sound and other sound, one or more sensor circuits configured to transmit one or more sensor signals from the one or more sensors, and a controller in communication with the one or more lights. The controller may be configured to receive the actuator signals that are transmitted by the actuator circuit from the actuator, receive one or more sensor signals that are transmitted by the one or more sensor circuits from the one or more sensors, and differentiate between the one or both of (i) gunfire light and other light and (ii) gunfire sound and other sound based on the sensor signals, and control whether the one or more lights are switched on or off responsive to differentiating between the one or both of (i) gunfire light and other light and (ii) gunfire sound and other sound. The controller may have a standby mode and be configured to switch the one or more lights on and off in response to the actuator signals when the controller is in the standby mode.

In some embodiments, the controller has a threat mode, and is configured to identify gunfire, to enter the threat mode when the controller identifies gunfire, and to switch the one or more lights off when the controller enters the threat mode. The controller may be configured to remain unresponsive to the actuator signals when the controller is in the threat mode such that the controller will not switch on the one or more lights when the controller is in the threat mode. The controller may be configured to differentiate between the gunfire infrared light and the other infrared light. The one or more sensors may be an infrared sensor that is configured to sense gunfire infrared light and other infrared light, or a microphone that is configured to sense sound.

In some embodiments, the controller may be configured to (i) differentiate between the gunfire sound and the other sound, and optionally (ii) count of a number of shots of the gunfire, and optionally (iii) identify a location of the gunfire, and optionally (iv) identify a type of gun that produced the gunfire.

In some embodiments, the base unit includes an indicator light configured to emit a caution color or an alert color in communication with the controller, and the controller is configured to identify whether gunfire occurs at an immediate location, enter a threat mode responsive to identifying gunfire, and cause the indicator light to change from a caution color to an alert color responsive to entering the threat mode. The controller may be configured to activate a camera when the controller enters a threat mode; and the camera is configured to transmit a video signal to the controller when the camera is activated.

In some embodiments, the light switch system includes a system processing unit in communication with the controller configured to record the video signal to create recorded video when the controller is in the threat mode and transmit the video signal and the recorded video to the emergency responders when the controller is in the threat mode.

In some embodiments, the light switch system includes a microphone configured to transmit an audio signal, and a system processing unit in communication with the controller configured to record the audio signal to create recorded audio when the controller is in a threat mode, and transmit the audio signal and the recorded audio to the emergency responders when the controller is in the threat mode.

In some embodiments, the light switch system includes one or more additional base units wherein each additional base unit includes a light switch housing, actuators, actuator circuits, sensors, sensor circuits, and controllers that are substantially similar to the light switch housing, actuator, actuator circuit, one or more sensors, one or more sensor circuits, and controller of the base unit, and a system processing unit in communication with the controller of each base unit and configured to transmit a threat signal to the controller of each base unit when any controller identifies gunfire such that every controller enters the threat mode when any controller identifies gunfire, and notify emergency responders when any controller identifies gunfire. The controller of each base unit switches off one or more lights that each controller controls when any controller identifies gunfire.

In some embodiments, the disclosed technology includes an emergency response system. emergency response system includes a light switch system including a base unit with a light switch housing, an actuator configured to switch one or more lights on and off, and an actuator circuit configured to transmit actuator signals from the actuator. The system may include one or more sensors configured to detect one or both of (i) gunfire light and other light and (ii) gunfire sound and other sound, one or more sensor circuits configured to transmit one or more sensor signals from the one or more sensors, and a controller in communication with the one or more lights and configured to receive the actuator signals that are transmitted by the actuator circuit from the actuator, receive one or more sensor signals that are transmitted by the one or more sensor circuits from the one or more sensors, differentiate between the one or both of (i) gunfire light and other light and (ii) gunfire sound and other sound, and control whether the one or more lights are switched on or off responsive to differentiating between the one or both of (i) gunfire light and other light and (ii) gunfire sound and other sound. In some embodiments, the disclosed technology includes a method to respond to gunfire in a building, which includes identifying gunfire, switching off the one or more lights responsive to identifying gunfire, and notifying emergency responders that gunfire has been identified. The method may include transmitting a threat signal to the controller of each base unit responsive to identifying gunfire, and entering a threat mode responsive to transmitting the threat signal to the controller of each base unit. The method may include monitoring an immediate location of the base unit for gunfire, and transmitting from an infrared sensor located in the light switch system at least one of an infrared signal to the controller and an audio signal from a microphone located in the light switch system. The method may include differentiating between at least one of (i) gunfire light and other light; and (ii) gunfire sound and other sound. In some embodiments, the gunfire is identified by the controller or the system processing unit responsive to the differentiating.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Other features, details, utilities, and advantages of the claimed subject matter will be apparent from the following more particular written Detailed Description of various implementations as further illustrated in the accompanying drawings and defined in the appended claims.

These and various other features and advantages will be apparent from a reading of the following Detailed Description.

BRIEF DESCRIPTION OF THE DRAWINGS

The preferred and other embodiments are disclosed in association with the accompanying drawings in which.

DETAILED DESCRIPTION

In the following description, for the purposes of explanation, numerous specific details are set forth to provide a thorough understanding of the present invention. It will be apparent, however, to one skilled in the art that the present invention may be practiced without some of these specific details. For example, while various features are ascribed to particular implementations, it should be appreciated that the features described with respect to one implementation may be incorporated with some other implementations as well. Similarly, however, no single feature or features of any described implementation should be considered essential to the invention as some implementations of the invention may omit such features.

Various aspects of this disclosure relate to a gunfire detection system or light switch system configured to respond to gunfire. In some embodiments, a system may be configured to respond to gunfire with the features described herein and not be configured as a light switch.

Systems and methods to improve safety in public places are continually evolving. Innovation meets multiple needs such as improved detection of threats, improved response to threats, improved dissuasion of bad actors, and improved assurance to the public. Systems and methods to minimize risk are desirable.

Figure 1:
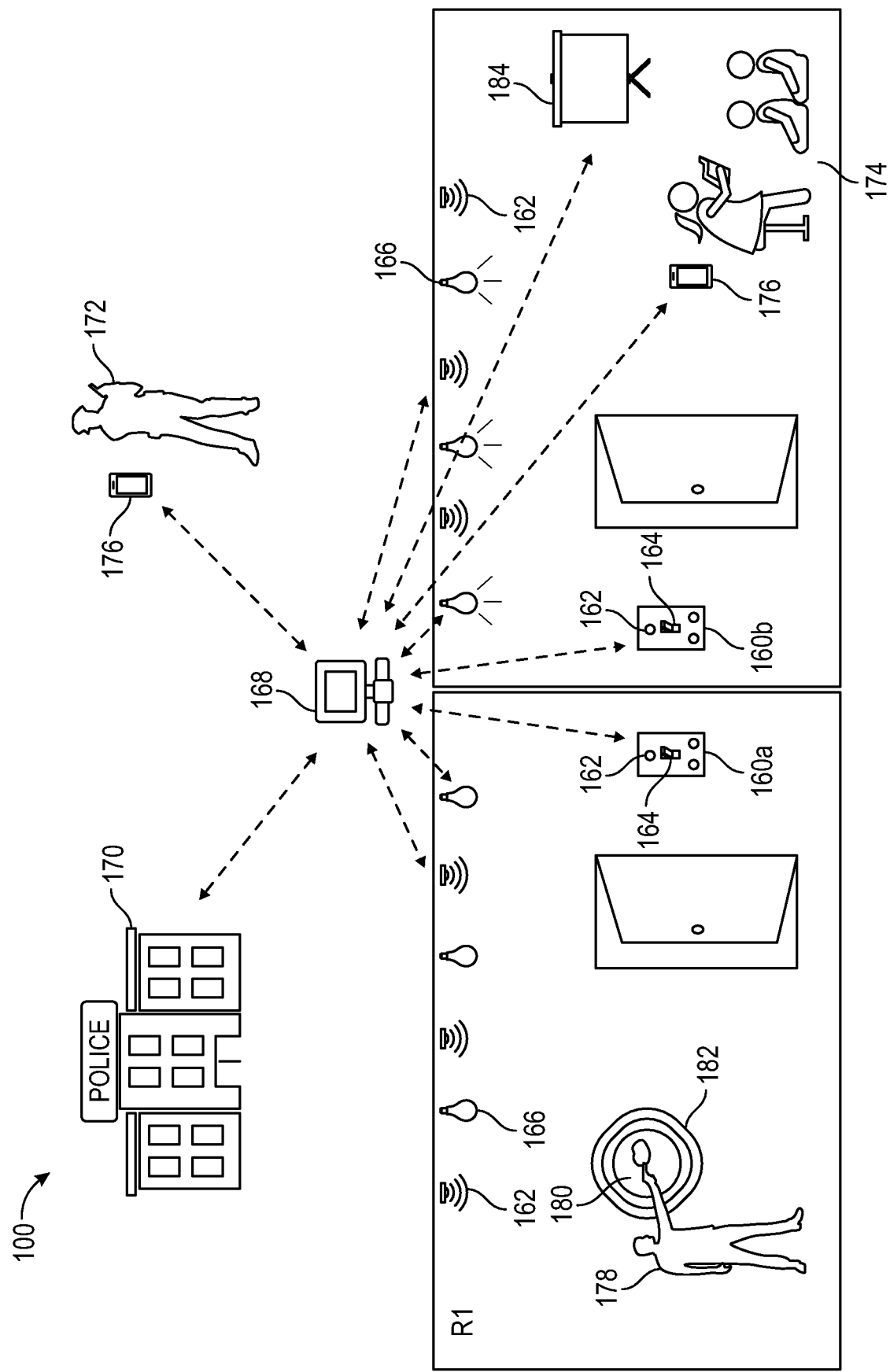
FIG. 1 illustrates an example light switch system in accordance with aspects of the present disclosure.

FIG. 1 illustrates an example of a light switch system 100 in accordance with aspects of the present disclosure. In the illustrated embodiment, the light switch system is operating in two rooms, R1 and R2. The light switch system may operate in one room or any number of rooms, such as 50 or 150 rooms, for example. In some embodiments, the light switch system may operate inside or outside of a building, as the gunfire detection system or light system described here could be installed in an interior wall, exterior wall, or other area.

The light switch system 100 includes base units 160a and 160b installed on walls in room R1 and R2 respectively. The base units 160 may be configured for installation in a wall of a building or other area. The base units 160 may include any number of sensors 162 and actuators 164. In the illustrated embodiment, base units 160a and 160b each include three sensors 162 and a light switch actuator 164. The base units 160 may be configured to turn on and turn off the lights 166 of each room. The light switch system may include sensors 162 in areas other than a base unit. The sensors 162 may be in the ceiling, walls, and floors, or on shelves and furniture, for example.

The light switch system may include a network system 168. For illustration, the network system 168 is shown in communication with various components. The network system 168 may be in the base unit(s) or may be elsewhere. The network system 168 may include a controller, a signal processing unit, communication circuitry, a wireless network, an application server, distributing computing system, analytical server, or other computing system as described herein. Each of these components may be located together, separate in proximity to each other, and/or in separate locations. The network system 168 may be configured to communicate, control, and/or interact with base units 160, sensors 162, actuators 164, lights 166, emergency response organizations 170, emergency response personnel 172, non-threat building occupants 174 such as children and teachers, user devices 176, and output devices 184.

User devices 176 may include personal devices such as phones and laptops and wearable devices such as watches and heart rate monitors, for example. In some embodiments, the network system 168 may communicate with emergency response personnel 172 and non-threat building occupants 174 via user devices 176. In some embodiments, the network system 168 may communicate with emergency response personnel 172 and non-threat building occupants 174 via output devices 184 such as building televisions, projectors, speakers, or other methods as described in the present disclosure.

In the illustrated embodiment, a threat 178 is shown in room R1. A threat 178 may be a bad actor with a firearm 180. When the threat 178 fires a firearm 180, gunfire signals 182 are produced in the form of light, infrared light, sound, acoustics, motion, temperature, pressure, and any form of other detectable signal from a firearm.

The sensors 162 may work continuously, intermittently, or on command to detect signals and collect sensor data of the surrounding environment. In the illustrated embodiment, the collected sensor data in room R1 includes gunfire signals 182. The sensor data including gunfire signals 182 may then be sent to the network system 168. The network system 168 may then process the collected sensor data to identify gunfire in room R1. Once gunfire has been detected in R1, the network system 168 may turn off and disable the lights 166 in room R1 and notify emergency response organizations 170, emergency response personnel 172, non-threat building occupants 174, and user devices 176 of the detected threat. The network system 168 may send out a threat signal to all base units 160. In some embodiments, other gunfire response methods may be employed upon identification of gunfire as described in the present disclosure.

In the illustrated embodiment, the lights 166 are off and disabled in room R1 because gunfire has been identified in room R1. In the illustrated embodiment, the lights 166 are on and may be controlled in room R2 because gunfire has not been detected in room R2. In the illustrated embodiment, an output device 184 is shown displaying "THREAT" to non-threat building occupants 174 to notify them of the threat in room R1. The output device may be any device (e.g., screen, sign, microphone, light, etc.) capable of communicating a threat to others (e.g., emergency response personnel 172, non-threat building occupants, etc.). In some embodiments, all lights 166 may be turned off and/or disabled if gunfire is detected in any room.

Figure 2A:
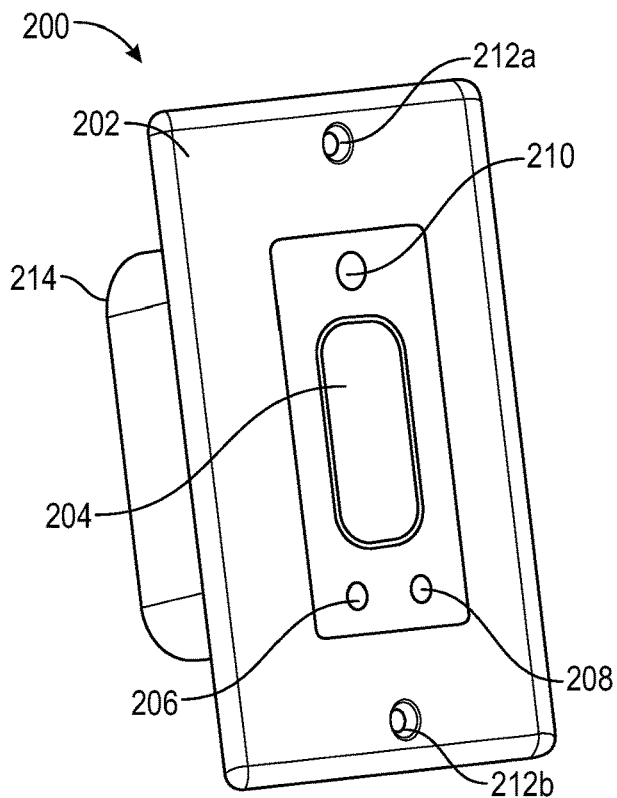
FIGS. 2A and 2B illustrate a front view and a rear view of a base unit in an example light switch system in accordance with aspects of the present disclosure.

FIG. 2A is an isometric front view of a base unit 200 of an example gunfire detection system or light system in accordance with aspects of the present disclosure. The base unit 200 may include a light switch housing which is configured for installation in a wall of a building. In the illustrated embodiment, the base unit comprises an outer surface 202 of the light switch housing. An actuator 204, depicted as a momentary button, is proximal to the outer surface 202 of the light switch housing in FIG. 2A, but may be located in other locations. FIG. 2A illustrates an embodiment with three sensors—infrared sensor 206, microphone 208, and a camera 210—proximal to the outer surface 202 of the light switch housing, although the sensors may be located in other locations.

Holes 212a and 212b through the outer surface 202 of the light switch housing are configured to fasten the base unit 200 to a wall to replace a conventional light switch. For example, nails or screws may be used protruding through the holes 212a and 212b to fasten the base unit 200 to a wall. Other attaching means may be used for installation of the base unit 200 to a wall and are contemplated.

A rear portion 214 of the light switch housing may contain actuator circuits, sensor circuits, controllers, processors, wireless or wired communication circuitry, among other elements.

Figure 2B:
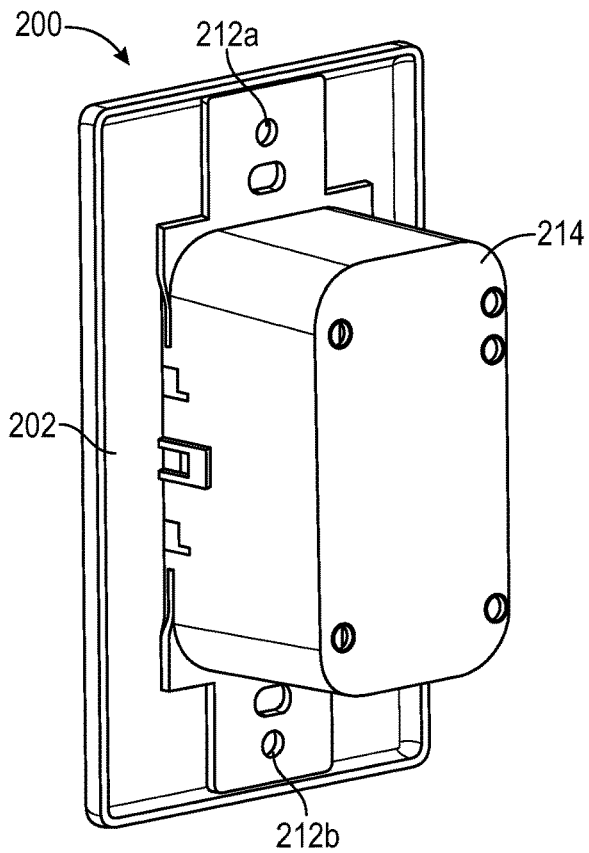

FIG. 2B depicts an isometric rear view of a light switch housing of a base unit 200 of this disclosure. The outer surface 202 of the light switch housing, the rear portion 214 of the light switch housing, and holes 212a and 212b through the outer surface 202 of the light switch housing are visible. A rear portion 214 of the light switch housing may contain actuator circuits, sensor circuits, controllers, processors, wireless or wired communication circuitry, among other elements.

Other configurations of the light switch system and housing are contemplated with components located in areas in, on, around, or in communication with other components of the light switch system and housing.

Figure 3:
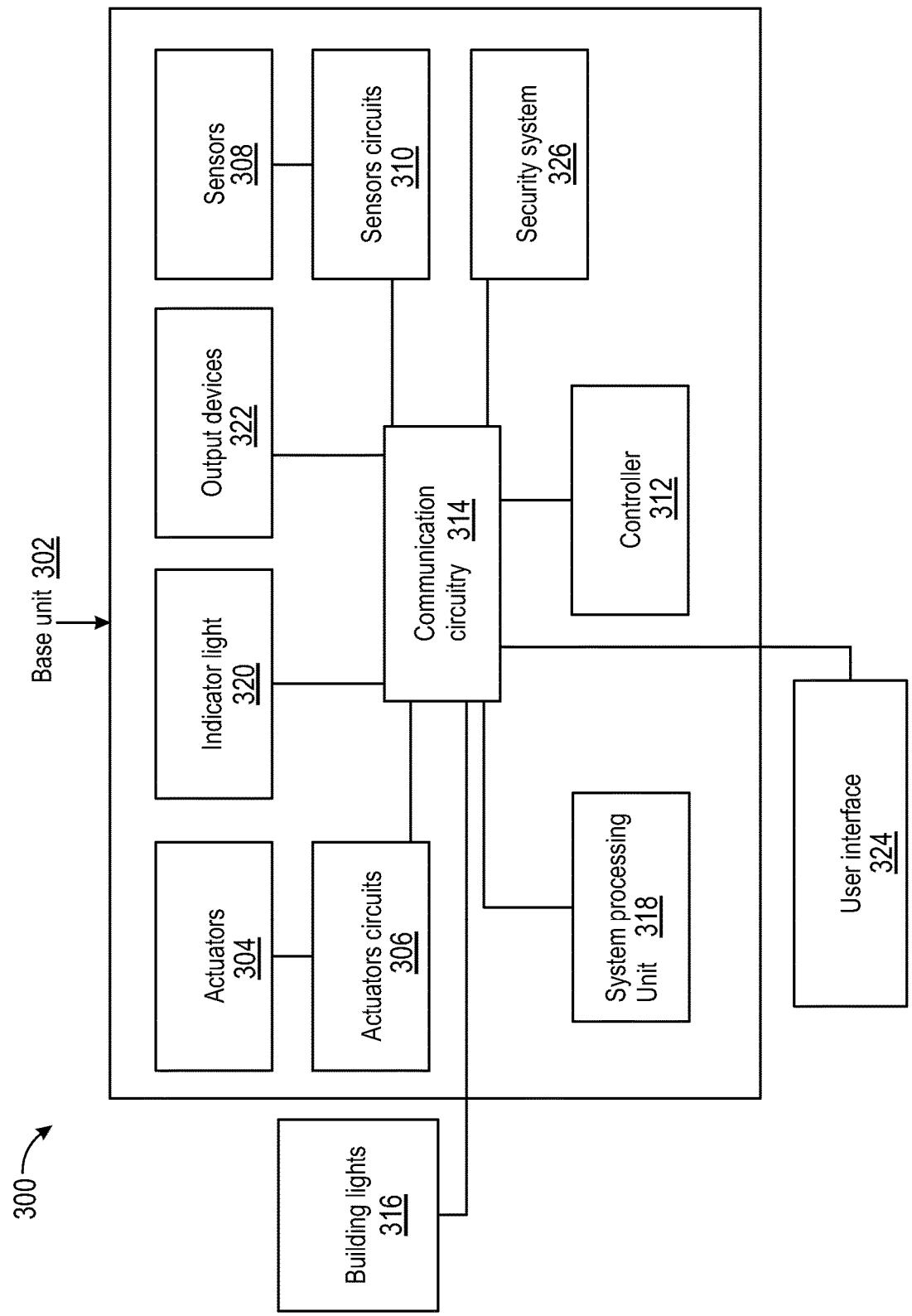
FIG. 3 is an example system diagram of a light switch system in accordance with aspects of the present disclosure.

FIG. 3 illustrates a system diagram of one embodiment of a light switch system 300 in accordance with aspects of the present disclosure. Embodiments of the light switch system may be and operate as a single unit or may be multiple units that are configured to communicate with each other and operate as a plurality. The light switch system 300 may replace a conventional light switch in a wall of a building or may be installed in a new void in the wall.

The base unit 302 may include an actuator 304. The actuator 304 may be a momentary button and/or a human interface to switch one or more building lights 316 on and off. The base unit 302 may comprise an actuator circuit 306, wherein the actuator circuit 306 is configured to transmit actuator signals from the actuator 304.

The base unit 302 includes one or more sensors 308 to detect and collect data from the surrounding environment. The detected and collected data may be used to identify gunfire, for example. In some embodiments, the sensors are located proximal to the outer surface of the light switch housing.

In an embodiment, the sensors 308 of the base unit 302 comprises an infrared sensor, a microphone, and a camera, such as in FIG. 1-2. The sensor(s) 308 may be configured to detect and collect data to be used to differentiate between (i) gunfire light and other light, (ii) gunfire sound and other sound, or (iii) both gunfire light and other light and gunfire sound and other sound, among other functions. The infrared sensor may be configured to detect infrared light with sufficient accuracy and precision to allow (i) differentiation between gunfire infrared light and other infrared light, and optionally (ii) counting of a number of shots of the gunfire, and optionally (iii) identification of a location of the gunfire. The microphone may be configured to detect sound with sufficient accuracy and precision to allow (i) differentiation between gunfire sound and other sound, and optionally (ii) counting of a number of shots of the gunfire, and optionally (iii) identification of a location of the gunfire, and optionally (iv) identification of a type of gun that produced the gunfire. The camera may be configured to detect and collect a video signal when the camera is activated.

The base unit 302 may include one or more sensor circuits 310. The one or more sensor circuits 310 are configured to transmit one or more sensor signals from the one or more sensors 308. For example, the one or more sensor circuits 310 may include a microphone circuit that is configured to transmit an audio signal from a microphone. In another example, the one or more sensor circuits 310 may include an infrared circuit that is configured to transmit an infrared signal from an infrared sensor. In yet another example, the one or more sensor circuits 310 may include a camera circuit that is configured to transmit a video signal from a camera.

The light switch system 300 may incorporate many types of sensors 308 to detect many types of signals, including audio, image, video, acoustic, thermal, seismic, subsonic, ultrasonic, pressure, humidity, and more. These signals may be used to discern gunshots amidst ambient noise/signals and differentiate them from other loud/noise-generating events, among other functions. The light switch system 300 is adaptable to integrate with future, not-yet-developed sensors, sensor technologies, or detection methodologies, ensuring system longevity and adaptability.

For example, the sensors 308 of the light switch system 300 may include barometric sensors to detect rapid changes in air pressure, a phenomenon associated with certain threats, including but not limited to gunshots. In another example, the system can recognize audio and sounds of bullet casings dropping or other indicative noises of threats. An integrated acoustics module may be used to rapidly distinguish between different firearm signatures, helping the system differentiate between officer and adversary weapons in real-time.

Utilizing infrared and thermal imaging sensors, sensors 308 may be used to detect and collect data to differentiate between individuals based on body heat patterns, assisting in distinguishing potential aggressors from hostages in situations where visual data may be unclear. Additionally, sensors 308 may be configured to detect and collect data to create a "heat map" based on movement, offering response personnel insights into high-traffic areas, potential points of conflict, or areas where individuals may be hiding or trapped. The sensors 308 may also include LIDAR and a suite of cameras to facilitate a 3D spatial mapping and image reconstruction of the premises.

The sensors 308 may include ultralow-light sensors to detect subtle movements or gestures, enabling potentially endangered individuals to discreetly signal for assistance. In some embodiments, the sensors 308 may include utilizing passive infrared (PIR) sensors to detect the presence of humans even in pitch-black conditions, ensuring continuous monitoring of occupant locations in compromised lighting scenarios.

The sensors 308 may incorporate tone and thermal movement detection capabilities for identifying emotional distress, bullying situations, and/or the presence of pests. The sensors 308 may integrate thermal, audio, and visual data for fall detection, to quickly identify individuals who might be incapacitated or in distress. In some embodiments, the system may include personal tracking modules and a real-time geolocation module, continuously monitoring and displaying the real-time locations of each officer or response personnel within the premises.

The base unit 302 may include a controller 312. The controller 312 may be configured to receive actuator signals that are transmitted by the actuator circuit 306 from the actuator 304. The controller 312 may be configured to receive one or more sensor signals that are transmitted by the one or more sensor circuits 310 from the one or more sensors 308. In an embodiment, the controller 312 is configured to receive one or more sensor signals, which are selected from an audio signal, an infrared signal, and a video signal, that are transmitted by the one or more sensor circuits 310, which are selected from a microphone circuit, an infrared circuit, and a camera circuit, respectively, from the one or more sensors 308, which are selected from a microphone, an infrared sensor, and a camera, respectively. The controller 312 may include a processor which may be configured to identify gunfire by analyzing signal data to differentiate between (i) gunfire light and other light, (ii) gunfire sound and other sound, or (iii) both gunfire light and other light and gunfire sound and other sound.

The controller 312 may transmit recorded or real-time signals from sensor(s) 308 to emergency responders via communication circuitry 314. For example, in some embodiments, the controller 312 is configured to transmit one, two, three, or each of the infrared signal, the video signal, and the audio signal in real-time or in a recorded format to at least some of the emergency responders when the controller 312 is in the threat mode.

In some embodiments, the controller 312 of each base unit 302 is configured to identify gunfire by receiving the threat signal from the system processing unit 318. In some specific embodiments, the controller 312 of each base unit 302 is configured to identify gunfire by (i) receiving the threat signal from the system processing unit 318, and/or by one or both of (ii) differentiating gunfire infrared light from other infrared light from an infrared signal; and (iii) differentiating gunfire sound from other sound from the audio signal with a processor within the controller. In some embodiments, the system processing unit 318 may be a different component from the controller 312 carrying out different operations. In other embodiments, the system may have a controller 312 or a system processing unit 318 carrying out operations.

The controller 312 may be configured to identify whether gunfire occurred at the immediate location. For example, the controller may be configured to identify whether gunfire occurred at the immediate location by differentiating gunfire sound from other sound from an audio signal of a microphone and/or by differentiating gunfire infrared light from other infrared light from infrared signals. In some specific embodiments, the controller is configured to identify whether gunfire occurred at the immediate location by receiving a threat location signal from a system processing unit.

In some embodiments, the controller 312 is in communication via communication circuitry 314 with the one or more building lights 316 such that the controller controls whether the one or more building lights 316 are switched on or off. The controller 312 may be configured to activate a camera, or other sensor(s) 308, when the light switch system 300 detects a threat. In some embodiments, the camera, or other sensor(s) 308, is configured to transmit a video signal to the controller 312 via the sensor circuit 310 and communication circuitry 314 when the camera is activated.

The communication circuitry 314 is a representation of the connections between the various components of an embodiment. The communication circuitry 314 may be wired or wireless technology. The communication circuitry 314 may incorporate transmitters and receivers. Individual components of an embodiment may be connected directly, indirectly, or not connected to each other. The communication circuitry may include or incorporate Wi-Fi, Bluetooth, Bluetooth Low Energy, Ethernet over Powerline, Near Field Communication, RFID, and other equivalent technologies. The communication circuitry may include a network, implemented by Wi-Fi for example.

The controller 312 may have a standby mode and a threat mode. In some embodiments, the controller 312 is configured to switch the one or more building lights 316 on and off in response to the actuator signals when the controller 312 is in the standby mode. In some embodiments, the controller 312 is configured to identify gunfire and may enter the threat mode when the controller identifies gunfire. When the controller 312 enters the threat mode, the controller 312 may be configured to switch the one or more building lights 316 off. In some embodiments, the controller 312 is configured to remain unresponsive to the actuator signals from the actuator 304 when the controller 312 is in the threat mode such that the controller 312 will not switch on the one or more building lights 316 when the controller 312 is in the threat mode.

The light switch system 300 may include a system processing unit 318. In some embodiments, the system processing unit 318 is in communication with the controller 312 of the base unit 302 via wired or wireless communication circuitry 314. For example, the communication circuitry 314 of the base unit 302 may include a wireless chip; and the system processing unit 318, located externally from the base unit 302, includes a system wireless chip that mediates communication with the wireless chip of the base unit 302 to allow communication with the controller 312. In another example, the system processing unit 318 is located within the base unit 302 and communicates with the controller 312 via wired or wireless communication circuitry 314.

The system processing unit 318 may be configured to notify emergency responders via communication circuitry 314 when gunfire has been identified. In some embodiments, the system processing unit is configured to transmit one, two, three, or each of the video signal, the recorded video, the audio signal, and the recorded audio to at least some of the emergency responders when the controller 312 is in the threat mode.

In some embodiments, the controller 312 of each base unit 302 is configured to identify gunfire by receiving the threat signal from the system processing unit 318. In some specific embodiments, the controller 312 of each base unit 302 is configured to identify gunfire by (i) receiving the threat signal from the system processing unit 318, and by one or both of (ii) differentiating gunfire infrared light from other infrared light from an infrared signal; and (iii) differentiating gunfire sound from other sound from the audio signal.

The controller 312 and/or the system processing unit 318 may be configured to record a video signal from the sensors 308 to create recorded video when the controller 312 is in the threat mode. In some embodiments, the controller 312 includes storage media that is configured to store the recorded video. In some embodiments, the system processing unit 318 includes system storage media that is configured to store the recorded video. The controller 312 and/or the system processing unit 318 may be configured to record an audio signal from the sensors 308 to create recorded audio when the controller 312 is in the threat mode. In some embodiments, the controller 312 includes storage media that is configured to store the recorded audio. In some embodiments, the system processing unit 318 includes storage media that is configured to store the recorded audio. The light switch system 300 may be configured such that the sensor 308 does not transmit the video signal when the controller 312 is in the standby mode. In some embodiments, the system processing unit 318 is configured not to record the video signal from the sensor 308 when the controller 312 is in the standby mode. In some specific embodiments, neither the controller 312 nor the system processing unit 318 are configured to record the video signal from the sensors 308 when the controller is in the standby mode.

The light switch system 300 may use the controller 312 and system processing unit 318 to incorporate advanced analysis methods and artificial intelligence (AI) techniques. The system 300 may incorporate databases that store specific signal patterns which may be used to discern a threat from a non-threat in that specific signal domain. For example, an acoustic signature database may be updated regularly to discern specific threat sounds amidst ambient noises.

In some embodiments, the light switch system 300 utilizes AI for various methods. For example, the system 300 may utilize AI for instantaneous threat detection and be optimized for gunshot recognition using real-time sensor data patterns. In another example, the system 300 may use AI to automate emergency response paths, factoring in the number of occupants, their profiles, and the identified threat to optimize survival rates. In another example, the system 300 may integrate advanced AI-driven analysis to forecast potential threats based on environmental data, historical patterns, and learned algorithms.

In another example, the light switch system 300 may incorporate an AI-driven "Whisper Alert" feature, allowing endangered occupants to send distress signals with minimal vocal output, detected and differentiated from typical ambient noise. The system 300 may include a voice stress analysis tool, designed to detect heightened emotional distress in voices, aiding in identifying potential hostages or those under duress during a situation. The system 300 may incorporate an SOS voice command functionality, allowing officers to send out distress signals or call for backup without manual radio communication, solely through a verbal cue. The system 300 may additionally feature a real-time negotiation assistance tool, which analyzes communication from hostage-takers, suggesting potential negotiation strategies or providing insights into the psychological state of the individuals involved.

The light switch system 300 may include AI-driven behavioral analysis, evaluating response personnel's movements to discern if they might be incapacitated, disoriented, or in distress, even in the absence of health metrics. The system 300 may be equipped to instantaneously communicate any officer's distress or compromised status to a centralized command hub, enabling rapid deployment of backup or medical assistance, and designed to automatically reroute nearby officers or response personnel to the location of an incapacitated colleague, ensuring rapid assistance. In some embodiments, the system 300 may include fall detection algorithms, promptly identifying if an officer or responder is immobilized, experiences a sudden change in orientation, or detects certain health parameters triggering an automated distress signal.

In another example, the light switch system 300 may utilize video analytics and AI-driven pattern recognition to identify and alert to visible weapons such as guns, knives, or other potential threats in the monitored environment. A behavior analysis module may also distinguish between typical hostage-taker movements and potential ones and rapidly identify known individuals in a hostage situation.

In another example, the light switch system 300 may be configured to calculate the potential "threat level" of targets based on advanced AI analyses of posture, movements, and potential carried weapons, guiding officers in decision-making. The AI may utilize a combination of neural networks trained on thousands of posture and movement patterns, alongside object recognition algorithms, to classify potential threats. The system may categorize threats on a scale of 1-10, with live feedback provided to officers, helping them prioritize response strategies.

In some embodiments, the base unit 302 may include an indicator light 320 that is proximal to the outer surface 102 of the light switch housing and in communication with the controller 312 via communication circuitry 314. An indicator light 320 is generally provided to indicate the existence of an emergency, and the indicator light is generally insufficient to illuminate an immediate location of a base unit 302. In some embodiments, the controller 312 is configured to cause the indicator light 320 to emit an alert color when the controller 312 enters the threat mode. In some specific embodiments, the alert color is a shade of red. In some embodiments, the alert color is red. The controller 312 may be configured to cause the indicator light 320 to change from the alert color to a caution color for a period of time after the controller 312 enters the threat mode if the controller 312 identifies that no gunfire occurred at the immediate location. In some embodiments, the caution color is a shade of yellow or orange. In some embodiments, the caution color is yellow. The period of time may be any number of different time periods. For example, the period of time may be at least one second and no greater than five minutes. In another example, the period of time is at least two seconds and no greater than two minutes. In yet another example, the period of time is at least five seconds and no greater than one minute.

The light switch system 300 may incorporate real-time alerts and displays via communication circuitry 314 and output devices 322. For example, the system 300 may be configured to transmit real-time data, visual alerts, warnings, and notifications to personal devices, such as mobile phones, smart watches, and VR/XR headsets. For example, the system may include a real-time live stream functionality to concerned parties or authorities immediately upon threat detection, providing them with instantaneous visual and auditory data from the scene. A real-time situational awareness module may furnish response personnel with live data including environmental conditions, number of detected occupants, and locations of potential threats. The system 300 may additionally implement a near-instant replay functionality, enabling security or other responsible personnel to promptly analyze moments leading up to a detected threat.

The light switch system 300 may be configured to project real-time data, visual alerts, warnings, and notifications onto walls, floors, and ceilings with output devices 320. For example, the system 300 may be equipped with the capability to project a real-time visual representation or simulation of a threat detected in an adjacent room onto a wall, effectively allowing authorities or occupants to perceive the threat as if "seeing through the wall." The system 300 may be designed to project via output devices 322 silent visual cues or instructions onto surfaces only visible under specific light or viewing conditions, guiding hostages safely without alerting potential threats.

The light switch system 300 may be designed to provide response personnel with visual cues or highlights on projected displays or transmitted feeds, indicating areas that have been cleared, are active threat zones, or need further inspection. The system 300 may be designed to automatically highlight exit and entry points, safe zones, and potential vantage points on its projected displays or transmitted data, aiding response personnel in strategic movement and positioning. The system 300 may also include a tactical advantage module, offering real-time insights into nearby cover, safe zones, or defensible positions for officers in high-risk situations, using a combination of environmental data and threat assessment. The system 300 may also be equipped to detect and notify response personnel of fortified or reinforced areas within a building, preparing them for potential areas of resistance or entrenchment.

The light switch system 300 may include smart televisions and building-wide speaker systems, connected via communication circuitry 314, configured to seize control in emergency situations. Upon detecting a threat, the system 300 can automatically override ongoing broadcasts or audio outputs to provide real-time auditory and visual instructions, guiding occupants to the safest egress points. Concurrently, the system 300 may communicate to officers or response personnel, delivering vital information about the shooter's identity, location, and potential movements, ensuring an informed and rapid response. This integration ensures both occupants and officers receive synchronized, real-time updates, optimizing safety and response efficiency.

The light switch system 300 may include a "last stand" functionality, wherein, if an officer is severely compromised and backup is delayed, the output devices 322 project intimidating visual or auditory deterrents to potential aggressors, utilizing AI to determine the most effective deterrence method in the context. For example, rapid-response strobe lighting may temporarily disorient potential threats and provide vital time for individuals to seek cover or escape. In some embodiments, AI analyses real-time data from cameras, microphones, and other sensor(s) 308 to gauge the aggressor's reaction to various stimuli and adjusts its deterrent strategies accordingly. Specific pre-loaded deterrent templates, based on a combination of frequency modulation for auditory signals and color dynamics for visual signals, are selectively deployed based on the AI's rapid analysis.

The light switch system 300 may also incorporate a "Panic Mode" feature, which when activated, dims the light to provide cover, while simultaneously highlighting safe exit paths on floors or walls using low-level lighting projections. The system 300 may use integrated LIDAR and optical sensors to continuously map the environment and determine the quickest and safest egress routes. For example, the highlighted paths may be color-coded, with green indicating a confirmed safe route, yellow for a potential route requiring caution, and red for areas with identified threats. The system 300 may also incorporate sound masking capabilities, allowing response personnel to create temporary auditory diversions, potentially disorienting hostage-takers and providing opportunities for hostage extraction.

The light switch system 300 may be user-interactive, providing feedback mechanisms, adjustable sensitivity levels, and allowing inhabitants to specify protocols via user interface 324. The user interface 324 may be accessible from various devices, facilitating easy customization, setting adjustments, and system health checks. Users may additionally manually input or tag areas of interest or potential vulnerability within the monitored environment, directing heightened sensitivity or attention to those regions. Further, the system 300 may be configured for multi-language support, ensuring threat notifications, and system interactions cater to a diverse range of users. The system 300 may be capable of synchronizing with other household electronic systems, allowing functions such as using a TV remote to control integrated light switches.

The user interface 324 may integrate a quick-access database, enabling response personnel to pull up building blueprints, prior incident reports, or known resident profiles, furthering situational awareness. The quick-access database may integrate external medical databases, enabling immediate access to an officer's, or another occupant's, medical history, allergies, or conditions in the event of an injury, ensuring targeted medical interventions.

In some embodiments, the user interface 324 may include or be configured to communicate with wearable devices, triggering them to provide tactile alerts, like vibrations, guiding wearers discretely towards safe zones based on threat analysis. The wearable devices may facilitate immediate threat notifications or alerts directly to occupants' wearables. Wearable sensors may relay vital health statistics of response personnel, including heart rate, body temperature, and oxygen levels, and feature AI-driven behavioral analysis, evaluating response personnel's movements to discern if they might be incapacitated, disoriented, or in distress. Wearable devices may incorporate firearm tracking mechanisms, registering the direction of each gun's aim, the number of shots fired, shot trajectory predictions, gunshot recognition distinguishing between officers and potential adversaries, and alerting officers of potential high-risk shots. The system may employ a combination of gyroscopes and accelerometers within the firearm mechanism to accurately track its orientation and motion. The user interface 324 and communication circuitry 314 may leverage Near Field Communication, Bluetooth Low Energy, or equivalent technologies to accurately track and locate people or devices within a building.

The user interface 324 may incorporate an emergency data beacon, which when activated by an officer in distress, broadcasts critical data including last known location, health metrics, and situational context to nearby response personnel. The emergency data beacon may also allow officers in distress to send out signals and enable colleagues to immediately identify and move toward them.

The system 300 may be designed to continuously record and store data surrounding any incident involving officer distress, injury, or fatality, ensuring evidence preservation and facilitating subsequent investigations. Additionally, a comprehensive after-action review module may be featured, wherein each officer's movements, weapon discharges, and decisions are analyzed post-operation, providing insights and training opportunities. The system 300 may provide training modes or simulation scenarios, enabling occupants or security personnel to familiarize themselves with system functionalities and potential alert scenarios.

The light switch system 300 may include tamper detection methods and encrypted communication protocols to ensure the privacy and security of transmitted data via security system 326. The security system 326 may prevent tampering, among other methods, by integrating biometric authentication mechanisms, ensuring only authorized personnel can access critical functions and data, while immediately alerting to unauthorized access attempts. The security system 326 may feature an encrypted two-way communication channel, enabling direct communication between occupants and response personnel, ensuring clarity and coordination during interventions. The security system 326 may also integrate discreet communication channels, enabling potential hostages to communicate with response personnel without alerting hostage-takers when safe to do so.

The light switch system 300 may be designed to operate at varied power consumption levels, optimizing for energy efficiency without compromising detection and response capabilities, and be designed to function seamlessly during power or network outages, ensuring continuous monitoring and immediate response actions. The security 326 system may include self-diagnostics and self-repair algorithms, proactively identifying system anomalies or malfunctions, and attempting to rectify them autonomously.

In some embodiments, the security system 326 and user interface 324 may include RFID (Radio-Frequency Identification) integration, enabling location tracking of individuals or assets within the premises. Furthermore, the system can interact with RFID-enabled door locks or other mechanisms, providing enhanced security measures by locking or unlocking based on predetermined criteria. Additionally, the light control feature of the system can be secured, allowing access only to designated individuals, such as maintenance personnel, through the recognition of their specific RFID tags.

In some embodiments, the security system 326 may include advanced facial recognition capabilities, which can be used to control access to doors or areas within the premises. Upon identifying an authorized individual through facial scans, the system can automatically unlock doors or activate specific light configurations. Conversely, unauthorized individuals or those not recognized by the security system 326 will be denied access, ensuring enhanced security and personalized lighting experiences.

The security system 326 may additionally be configured to detect and recognize abnormal activities within a building such as water leaks, gas leaks, fires, electrical issues, HVAC malfunctions, and Wi-Fi signal disturbances, which could be indicative of certain threats or electronic tampering. For example, the security system 326 may be programmed to recognize low battery alarms or maintenance alerts from smoke alarms or other household alert systems. Once a hazard has been detected, the system 300 may notify occupants of such safety hazards and/or activate safety mechanisms such as sprinklers in the case of a fire.

The light switch system 300 may include a single base unit 302 or may include a plurality of base units 302. A plurality of base units 302 may communicate and work together via communication circuitry 314. In some embodiments, the system processing unit 318 is in wireless communication with each base unit via communication circuitry 314. In some specific embodiments, each base unit 302 comprises a wireless chip; and the system processing unit 318 comprises a system wireless chip that mediates communication with the wireless chip of each base unit 304 to allow communication with the controller 312 of each base unit via communication circuitry 314. In some embodiments, each base unit 302 includes a wireless chip that mediates communication between the controller 312 of each base unit 302 and the system processing unit 318; and the system processing unit 318 includes a system wireless chip that mediates communication with the wireless chip of each base unit 302 to allow communication between the system processing unit 318 and the controller 312 of each base unit 302.

For example, in some embodiments, the light switch system 300 includes a system processing unit 318 in communication with the controller 312 of each base unit 302 and may be configured to notify emergency responders when any individual base unit 302 identifies gunfire. In another example, the system processing unit 318 is configured to transmit a threat signal to the controller 312 of each base unit 302 when any controller 312 identifies gunfire such that every controller 312 enters a threat mode when any controller 312 identifies gunfire. In yet another example, the light switch system 300 may be configured such that the controller 312 of each base unit 302 switches off each building light 316 that the controller 312 controls when any controller 312 identifies gunfire.

At least some base units 302 of the plurality of base units 302 may be located at different immediate locations, which may be different rooms in a building. In some embodiments, the controller 312 of each base unit 302 is configured to identify that gunfire occurred at its immediate location when the signal processing unit 318 identifies gunfire by differentiating (i) gunfire infrared light from other infrared light from an infrared signal and/or by differentiating (ii) gunfire sound from other sound from the audio signal. In some embodiments, the controller 312 of each base unit 302 is configured to identify whether gunfire occurred at its immediate location by receiving a threat location signal from the system processing unit 318. The controller 312 may identify that no gunfire occurred at its immediate location (when the controller 312 identifies gunfire by receiving the threat signal from a system processing unit 318) by one or both of differentiating (i) gunfire infrared light from other infrared light and differentiating (ii) gunfire sound from other sound. In some embodiments, the controller 312 of each base unit 302 is configured to cause the indicator light 320 to change from the alert color to a caution color a period of time after the controller 312 enters the threat mode if the controller 312 identifies that no gunfire occurred at the immediate location of its base unit 302.

In some embodiments, the controller 312 of each base unit 302 is configured to transmit the one or more sensor signals of the one or more sensors 308 of its base unit 302 to the system processing unit 318; and the system processing unit 318 is configured to identify gunfire by differentiating one or both of (i) gunfire infrared light from other infrared light from an infrared signal and (ii) gunfire sound from other sound from the audio signal. In some specific embodiments, the system processing unit 318 is configured to identify gunfire by differentiating one or both of (i) gunfire infrared light from other infrared light and (ii) gunfire sound from other sound; the controller 312 of each base unit 302 is not configured to identify gunfire by differentiating one or both of (i) gunfire infrared light from other infrared light and (ii) gunfire sound from other sound; and the controller 312 of each base unit 302 is only configured to identify gunfire by receiving the threat signal from the system processing unit 318. In some embodiments, the system processing unit 318 or controller 312 is configured to notify emergency responders that gunfire has been identified when the system processing unit 318 identifies gunfire. In some embodiments, the light switch system 300 is configured such that the controller 312 of each base unit 302 switches off each building light 316 that the controller 312 controls when the system processing unit 318 identifies gunfire.

In some embodiments, each base unit 302 of the plurality of base units 302 includes a wireless chip that mediates communication with the system processing unit 318; and the system processing unit 318 comprises a system wireless chip that mediates communication with the wireless chip of each base unit 302. In some specific embodiments, each base unit 302 of the plurality of base units 302 includes a wireless chip that mediates communication between the controller 312 of each base unit 302 and the system processing unit 318; and the system processing unit 318 includes a system wireless chip that mediates communication with the wireless chip of each base unit 302 to allow communication between the system processing unit 318 and the controller 312 of each base unit 302.

Various aspects of this disclosure relate to methods for responding to gunfire in a building, which includes providing a gunfire detection system or light switch system described anywhere in this disclosure. The methods may include monitoring, detecting, analyzing, identifying, and gunfire. The methods may also include testing the system and communicating with emergency responders and individuals located near the base units (including bystanders and gunmen). The light switch systems may include a base unit or a plurality of base units, and the base unit(s) may be installed in a wall or different walls of a building. The systems may be configured to respond to gunfire with the features described herein and not be configured as a light switch.

Figure 4:
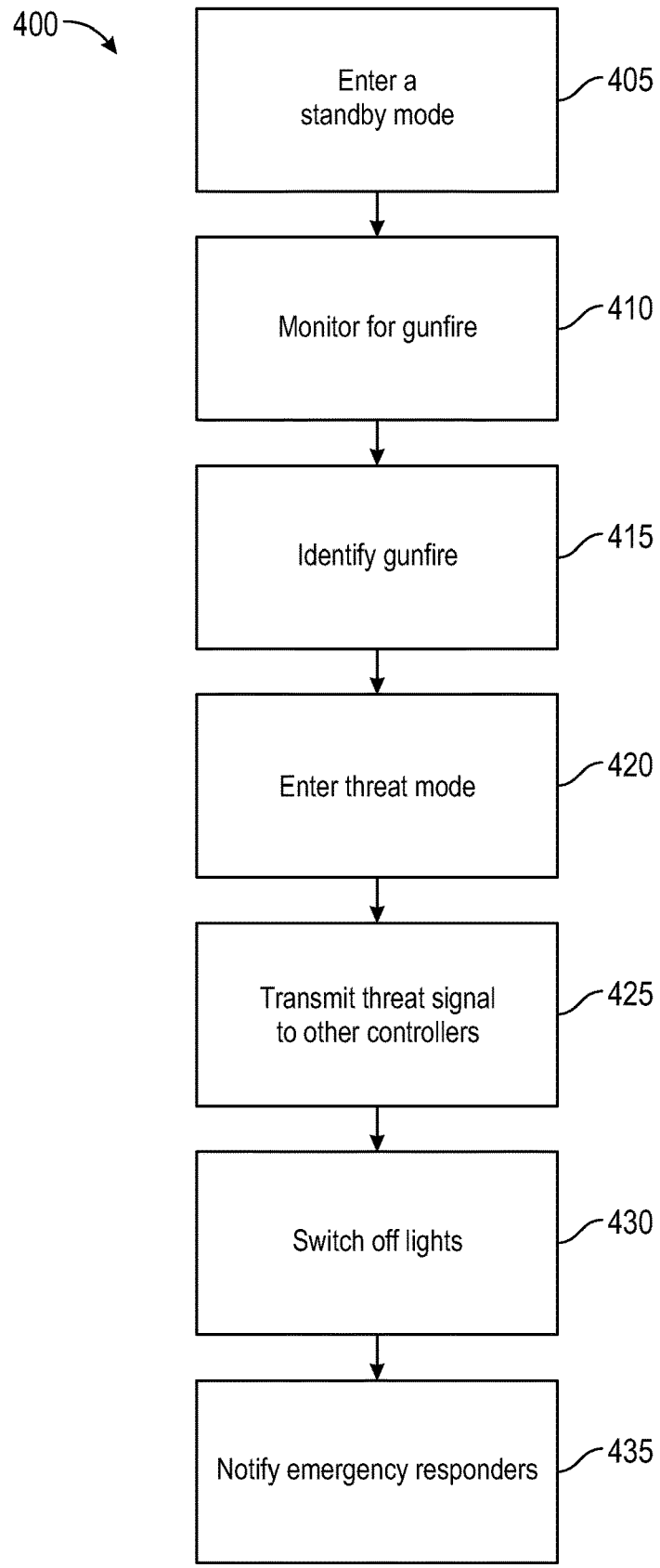
FIG. 4 is a flowchart of example operations that supports gunfire response in accordance with aspects of the present disclosure.

FIG. 4 is a flowchart of example operations 400 for operating a gunfire response system in accordance with aspects of the present disclosure. In the operations described, the light switch system includes a plurality of base units. In some embodiments, the light switch system may include only one base unit.

An operation 405 comprises the controller of each base unit entering a standby mode. The base unit may always be in a standby mode or if may enter a standby mode upon initiation or automatically by program and/or continuously, periodically, or on command.

If an actuator is actuated to switch the one or more lights on and off when a controller is in the standby mode, and the controller switches the one or more lights on and off.

An operation 410 includes monitoring multiple locations for gunfire. The monitoring may include transmitting a sensor signal from a sensor of a base unit to a controller of the base unit. For example, operation 404 may include transmitting one or more sensor signals from one or more sensors of each base unit to the controller of each base unit through one or more sensor circuits of each base unit.

An operation 415 includes a controller or system processor identifying gunfire. For example, controllers or system process of multiple base units may analyze the sensor signals, which provide information regarding the gunfire (e.g., gunfire occurring, the type of gunfire occurring, etc.). Identification of gunfire is described throughout this disclosure.

An operation 420 includes the system entering a threat mode. For example, the system that is in a standby mode changes to a threat mode in response to the identification of gunfire.

An operation 425 includes transmitting the threat signal to the controller of each base unit. In some embodiments, the system processing unit performs the transmitting. In some embodiments, the controller of each base unit enters the threat mode after the transmitting.

An operation 430 includes switching off one or more lights controlled by the controller of each base unit when the controller(s) enters the threat mode, wherein the controller of each base unit switches off the one or more lights. In some embodiments, if an actuator is actuated when a controller is in the threat mode, the controller does not switch the one or more lights on.

An operation 435 includes s notifying emergency responders that gunfire has been identified. In some embodiments, the system processing unit or the controller performs the notifying.

Figure 5:
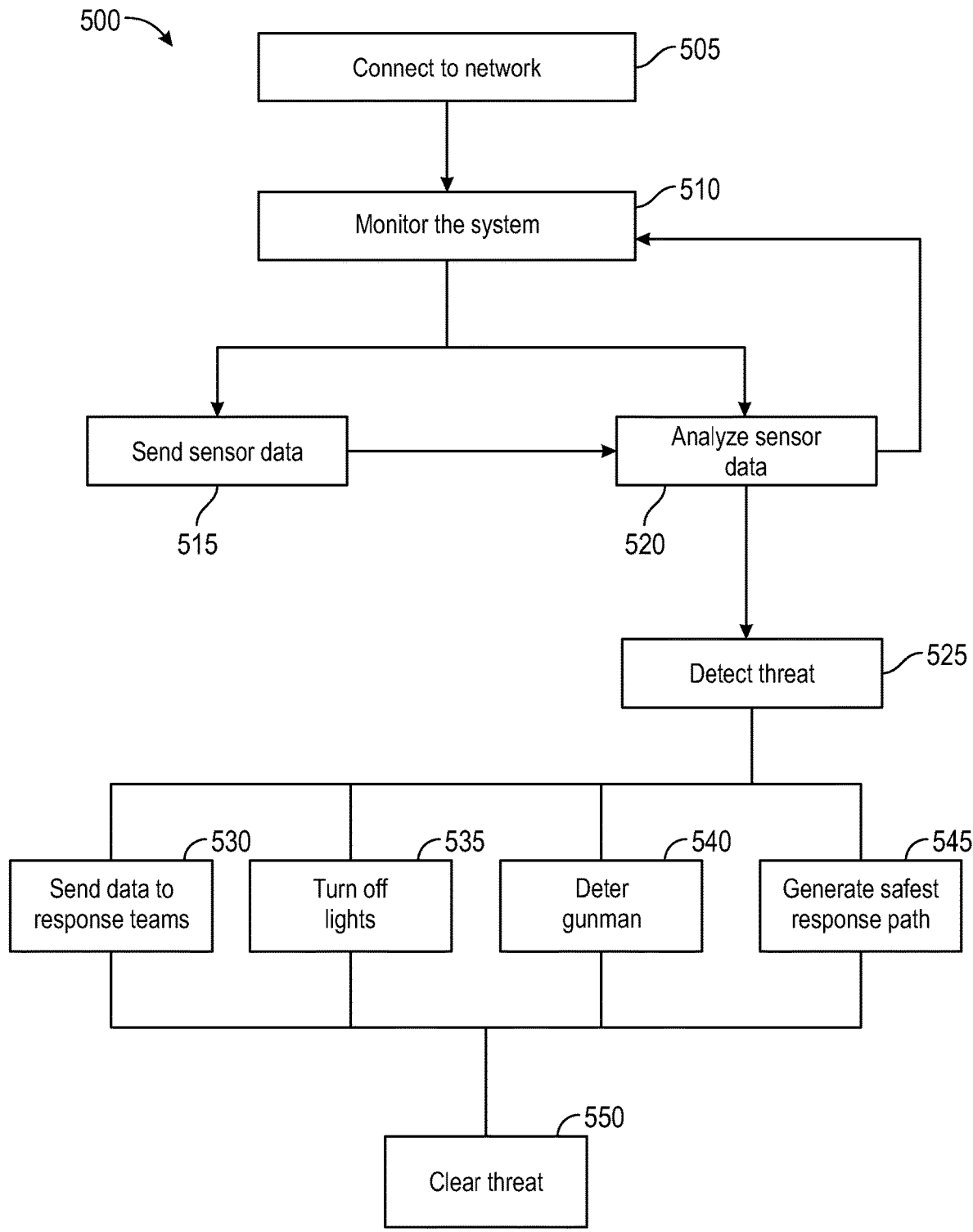
FIG. 5 is a flowchart of example operations that supports gunfire response in accordance with aspects of the present disclosure.

FIG. 5 is a flowchart of example operations 500 for operating a gunfire response system in accordance with aspects of the present disclosure. The operations described in FIG. 5 may also occur in or in combination with other operations described in this disclosure (e.g., FIG. 4). In the operations described in FIG. 5, the light switch system includes a plurality of base units. In some embodiments, the light switch system may include only one base unit.

Once a system is installed and powered on, an operation 505 includes connecting the system to a network. The network may comprise Wi-Fi, Bluetooth Low Energy, Emergency Communication Technology, and similar network technologies. The network may allow information and data to flow to components, devices, and users throughout the process of an embodiment. For example, the system may be connected to emergency response organizations (e.g., police and fire departments).

An operation 510 includes monitoring the system. For example, operation 510 may include monitoring with the sensors of the system. The sensors may collect sensor data from the area around the system continuously, periodically, or on command. Some sensors may be configured to remain off until command otherwise. Some sensors may always remain on and continuously collect data, and others may collect intermittent data.

The operation 510 may also include listening to system actuators and inputs. When a system actuator, such as a light switch, is actuated, the system may activate or deactivate the respective actuation, such as the building lights.

The operation 510 may also include the system listening to system inputs, such as user-interface inputs that facilitate adjustable sensitivity levels and allow inhabitants to specify protocols for example. System inputs may comprise various devices, including mobile phones, wearable devices, emergency data beacons, household electronics such as TV remotes, and other devices. The system inputs may be incorporated as described anywhere in this disclosure.

An operation 515 includes sending data to a system dashboard or user interface. For example, the system may send sensor data that provides emergency responders, building occupants, and others with user-access to the system to monitor the sensor data and signals in real-time. In some embodiments, the sensor data may allow emergency responders, building occupants, and others with user-access to the system to monitor recorded sensor data and signals.

An operation 520 includes analyzing the data for gunfire, threats, and other events of interest. For example, the system may analyze sensor data for gunfire, threats, and other events of interest as described anywhere in this disclosure, including comparing sensor data to a database with stored gunfire data (or other events of interest signal patterns). In some embodiments, artificial intelligence analyzes the sensor data for gunfire, threats, and other events of interest. The operations 510, 515 and 520 may occur continuously as the system responds to ongoing activity near the base units.

An operation 525 comprises detecting a threat based on the analyzed data in operation 520. For example, if the sensors sense gunfire, and the data analyzed confirms the gunfire, the system detects a threat. In some embodiments, the system will enter a threat mode. When the threat is detected, a threat signal may be propagated to the base units of the system, user devices, and user interface.

Operation 530-555 include various possible responses to detecting the threat as described in this disclosure. One or more of these operations may occur in a system, and occur simultaneously or in response to another operations.

For example, An operation 530 may include sending data directly to emergency responders. An operation 535 may include turning off the lights. Turning off the lights may also include disabling light switch controls. An operation 540 may include deterring attackers or threats using available devices and mechanisms (e.g., lights, fire alarms, speakers, sprinklers, TVs, etc.). An operation 545 may include generating a safest response path. In some embodiments, operation 545 may include streaming the safest response path for escape and/or response information on TV and walls.

An operation 550 includes clearing the threat. The system continuously performing the 510 monitoring operation will monitor when a user or a response team or a response signal communicates that the threat can be cleared. For example, the emergency responders may send communications via the network that the threat no longer exists. In some embodiments, the clear threat signal may result in a system reset or the system returning to a standby mode.

Figure 6:
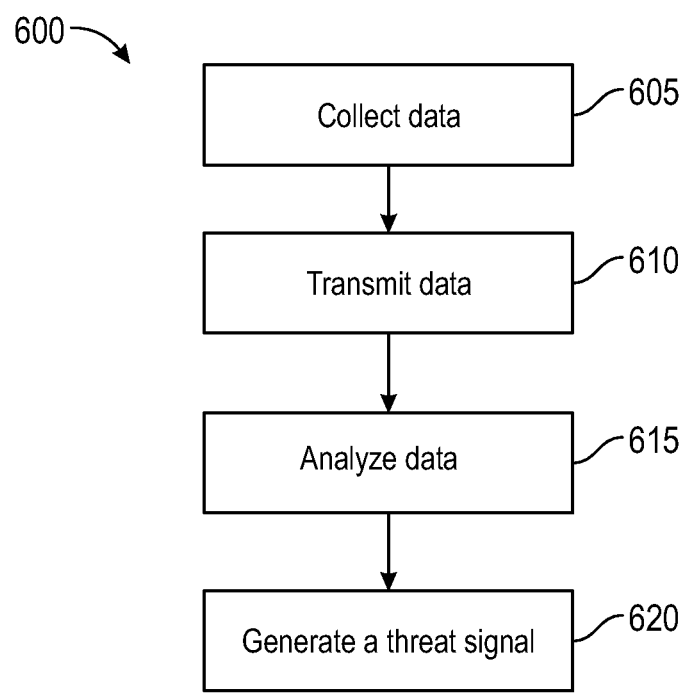
FIG. 6 is a flowchart of example operations that supports gunfire detection in accordance with aspects of the present disclosure.

FIG. 6 is a flowchart of example operations 600 for analyzing detected gunfire. The gunfire detection system or light switch system analyzes, detects, identifies gunfire as described anywhere in this disclosure.

An operation 605 includes collecting data of the surrounding environment continuously, intermittently, or on-command. For example, sensors may collect sensor data from any type of sensor as described in the present disclosure.

An operation 610 includes transmitting the collected sensor data of the surrounding environment to a processor within the gunfire detection system or light switch system. The data may be transmitted via wired or wireless communication circuitry.

An operation 615 includes analyzing the collected sensor data to differentiate and identify gunfire and other threats. The analyzing may include, among other analysis techniques, comparing the collected sensor data with stored data patterns to identify gunfire/threats; and/or utilizing AI on the collected sensor data to identify gunfire/threats. AI may be trained to recognize gunfire and other threats via machine learning. In an embodiment, the system uses AI pattern recognition to identify gunfire. [Can you add more description here.]

The 615 analyzing operation may include differentiating with the controller gunfire infrared light from other infrared light via an infrared signal. The 615 analyzing operation may include differentiating with the controller gunfire sound from other sound via an audio signal from a microphone. In some embodiments, the 615 analyzing operations may analyze the count of a number of shots of the gunfire, the type of gun that produced the gunfire and/or a location of the gunfire.

An operation 620 includes generating a threat signal based on the analyzed data in the 615 analyzing operation. The threat signal may be propagated to any relevant components of the system, such as the controller, system processing unit, user-devices, and user interface for example.

Figure 7:
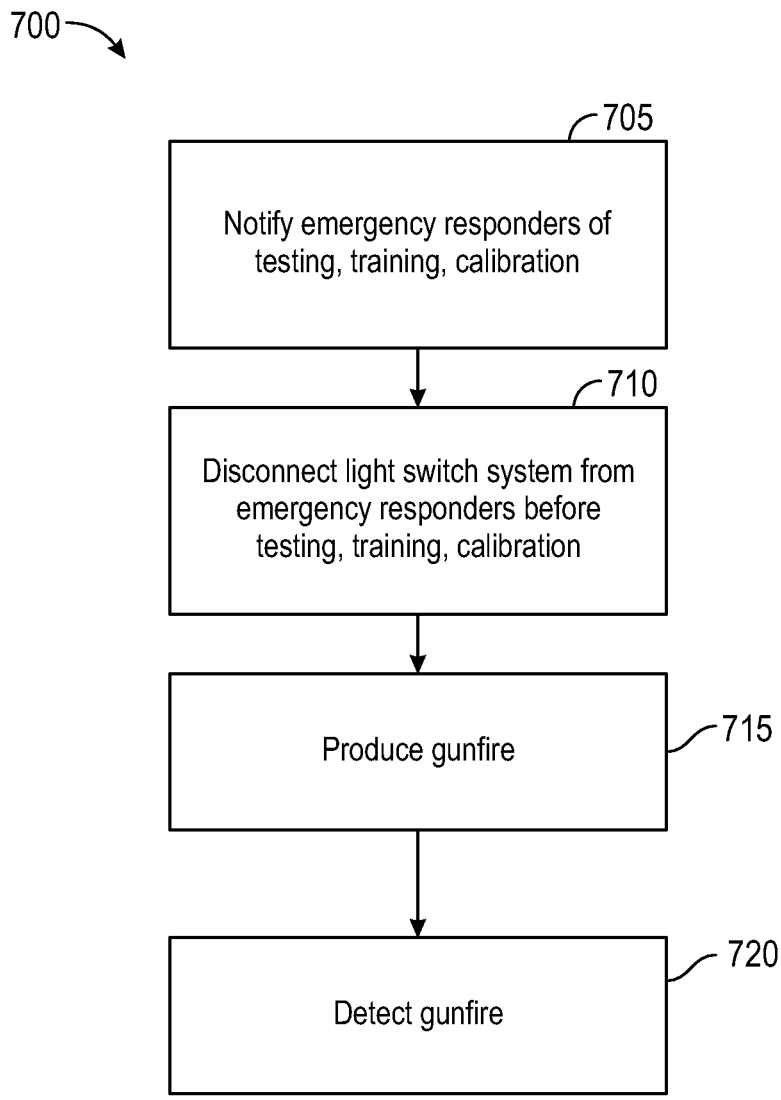
FIG. 7 is a flowchart of example operations that supports gunfire response system testing in accordance with aspects of the present disclosure.

FIG. 7 is a flowchart of example operations 700 of testing, calibrating, and/or training the light switch system to identify gunfire.

An operation 705 includes producing gunfire. In some embodiments, producing gunfire may be accomplished by firing blank rounds from a gun. In some embodiments, producing gunfire may be accomplished by firing live rounds from a gun into a bullet trap.

An operation 710 includes detecting one or both of gunfire light and gunfire sound by the one or more sensors collecting the data, and the signal processing unit/controller performing the detecting.

An operation 706 includes notifying emergency responders that the light switch system is being tested, trained, or calibrated prior to notifying emergency responders that gunfire has been identified to communicate to the emergency responders that the testing, training, or calibration is testing, training, or calibration.

An operation 708 comprises the light switch system being disconnected from communication equipment such that An operation 708 does not include notifying emergency responders that gunfire has been identified as the process is performed to test, train, or calibrate the light switch system. In some specific embodiments, An operation 708 includes disconnecting the light switch system from communication equipment prior to producing gunfire.

Various operations may be incorporated into, added in combination with, or instead of the operations described in the methods described in FIGS. 4-6, and throughout the disclosure.

In some embodiments, the system may include a method of monitoring an environment including receiving, from one or more sensors, response personnel's movements to discern if they might be incapacitated, disoriented, or in distress, even in the absence of health metrics; identifying, from response personnel's movements, if an officer or responder is immobilized, experiences a sudden change in orientation, or detects certain health parameters; and transmitting any officer's distress or compromised status to a centralized command hub to enable rapid deployment of backup or medical assistance.

In some embodiments, the system may include a method of monitoring an environment including receiving, from one or more sensors, building occupant movements and profiles; identifying, with video analytics and AI-driven pattern recognition, visible weapons such as guns, knives, or other potential threats in the monitored environment; distinguishing, with AI-driven pattern recognition, typical hostage-taker movements and potential ones to rapidly identify known individuals in a hostage situation; and transmitting the identified threats and hostage-taker movements to a centralized command hub to facilitate effective response.

In some embodiments, the system may include a method of monitoring an environment including receiving, from one or more sensors, building occupant movements and profiles; calculating the potential "threat level" of targets from AI analyses of posture, movements, and potential carried weapons; categorizing threats on a scale, for example 1-10; and transmitting the threat level to emergency responders to guide in decision-making and help prioritize response strategies. The AI may utilize a combination of neural networks trained on thousands of posture and movement patterns, alongside object recognition algorithms, to classify potential threats.

In some embodiments, the system may include a method of monitoring an environment, incorporating an AI-driven "Whisper Alert" feature including receiving, from one or more sensors, voice signals with minimal vocal output to be differentiated from typical ambient noise; detecting heightened emotional distress in voices, aiding in identifying potential hostages or those under duress during a situation; transmitting communication, via a SOS voice command functionality, distress signals or call for backup without manual radio communication, solely through a verbal cues; and transmitting, via a real-time negotiation assistance tool, communication from hostage-takers to a centralized command hub and suggesting potential negotiation strategies or providing insights into the psychological state of the individuals involved.

In some embodiments, the system may include a method of tampering protection including integrating RFID (Radio-Frequency Identification) to the one or more sensors; securing RFID-enabled door locks or other mechanisms to provide enhanced security measures by locking or unlocking based on predetermined criteria; and securing the light controls by allowing access only to designated individuals, such as maintenance personnel, through the recognition of their specific RFID tags.

In some embodiments, the system may include a method of tampering protection including integration of facial recognition capabilities to the one or more sensors; securing facial recognition enabled door locks or other mechanisms to provide enhanced security measures by locking or unlocking based on predetermined criteria; and securing the light controls by allowing access only to designated individuals, such as maintenance personnel, through the recognition of their face.

In some embodiments, the system may include a method of tampering protection including integrating biometric authentication mechanisms, ensuring only authorized personnel can access critical functions and data, while immediately alerting to unauthorized access attempts.

In some embodiments, the system may include a method of privacy protection including integrating an encrypted two-way communication channel, enabling direct communication between occupants and response personnel, ensuring clarity and coordination during interventions.

In some embodiments, the system may include a method of privacy protection including integrating discreet communication channels, enabling potential hostages to communicate with response personnel without alerting hostage-takers when safe to do so.

In some embodiments, the system may include a method of interacting with wearable devices including generating tactile alerts, like vibrations, to guide wearers discretely towards safe zones based on threat analysis; transmitting immediate threat notifications or alerts directly to occupants' wearables; and receiving vital health statistics of response personnel, including heart rate, body temperature, and oxygen levels.

In some embodiments, a method includes accessing a database, enabling response personnel to pull up building blueprints, prior incident reports, or known resident profiles, furthering situational awareness.

In some embodiments, a method includes accessing external medical databases, enabling immediate access to an officer's, or another occupant's, medical history, allergies, or conditions in the event of an injury, ensuring targeted medical interventions.

In some embodiments, a method includes receiving, from the one or more sensors, barometric signals to detect rapid changes in air pressure, a phenomenon associated with certain threats, including but not limited to gunshots.

In some embodiments, a method includes receiving, from the one or more sensors, audio signals of bullet casings dropping or other indicative noises of threat to recognize a threat.

In some embodiments, a method includes receiving, from the one or more sensors, acoustic signals to rapidly distinguish between different firearm signatures, helping the system differentiate between officer and adversary weapons in real-time.

In some embodiments, a method includes generating a digital representation of a building by creating a "heat map" based on movement, offering response personnel insights into high-traffic areas, potential points of conflict, or areas where individuals may be hiding or trapped.

In some embodiments, a method includes generating a digital representation of a building by incorporating LIDAR and a suite of cameras and sensors to facilitate a 3D spatial mapping and image reconstruction of the premises.

In some embodiments, a method includes receiving infrared and thermal signals from one or more sensors and differentiating between individuals based on body heat patterns to assist in distinguishing potential aggressors from hostages in situations where visual data may be unclear from the one or more sensors.

In some embodiments, a method includes transmitting real-time data, visual alerts, warnings, and notifications to personal devices, such as mobile phones, smart watches, and VR/XR headsets.

In some embodiments, a method includes transmitting a real-time live stream functionality to concerned parties or authorities immediately upon threat detection, providing them with instantaneous visual and auditory data from the scene.

In some embodiments, a method includes transmitting a near-instant replay functionality, enabling security or other responsible personnel to promptly analyze moments leading up to a detected threat.

In some embodiments, a method includes generating a real-time situational awareness module to furnish response personnel with live data including environmental conditions, number of detected occupants, and locations of potential threats.

In some embodiments, a method includes generating, via an AI module, automated emergency response paths, factoring in the number of occupants, their profiles, and the identified threat to optimize survival rates.

Operations described above may be performed in any order, adding and omitting as desired, unless explicitly claimed otherwise or a specific order is inherently necessitated by the claim language.

Figure 8:
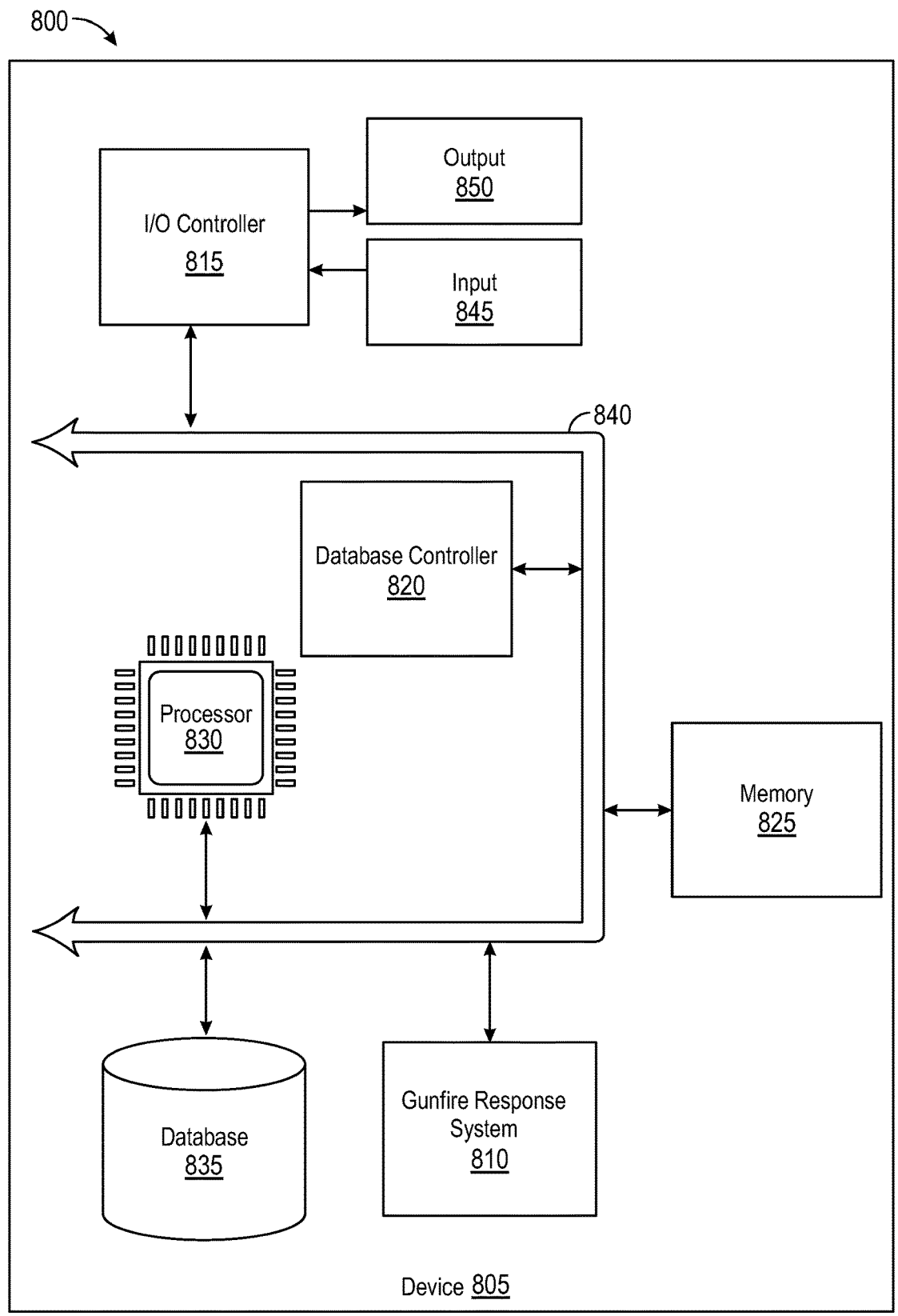
FIG. 8 is a block diagram for a software application that supports gunfire response in accordance with aspects of the present disclosure.

FIG. 8 shows an operation diagram of a system 800 including a device 905 that supports gunfire response in accordance with aspects of the present disclosure. The device 805 may be an example of or include or be in communication with the components of a gunfire detection or light switch system 300 as described herein. The device 805 may be an example of an application server, distributing computing system, analytical server, or other computing system as described herein. The device 805 may include components for bi-directional data communications including components for transmitting and receiving communications, including a gunfire response component 810, an I/O controller 815, a database controller 820, memory 825, a processor 830, and a database 835. These components may be in electronic communication via one or more buses (e.g., bus 840).

The gunfire response component 810 may be an example of gunfire detection or light switch system 300 as described herein. For example, the gunfire response component 810 may perform any of the methods or processes described above with reference to FIGS. 4 through 7. In some cases, the gunfire response component 810 may be implemented in hardware, software executed by a processor, firmware, or any combination thereof.

The I/O controller 815 may manage input signals 845 and output signals 850 for the device 805. The I/O controller 815 may also manage peripherals not integrated into the device 805. In some cases, the I/O controller 815 may represent a physical connection or port to an external peripheral. In some cases, the I/O controller 815 may utilize an operating system such as iOS®, ANDROID®, MS-DOS®, MS-WINDOWS®, OS/2®, UNIX®, LINUX®, or another known operating system. In other cases, the I/O controller 815 may represent or interact with a modem, a keyboard, a mouse, a touchscreen, or a similar device. In some cases, the I/O controller 815 may be implemented as part of a processor. In some cases, a user may interact with the device 805 via the I/O controller 815 or via hardware components controlled by the I/O controller 815.

The database controller 820 may manage data storage and processing in a database 835. In some cases, a user may interact with the database controller 820. In other cases, the database controller 820 may operate automatically without user interaction. The database 835 may be an example of a single database, a distributed database, multiple distributed databases, a data store, a data lake, or an emergency backup database.

Memory 825 may include random-access memory (RAM) and read-only memory (ROM). The memory 825 may store computer-readable, computer-executable software including instructions that, when executed, cause the processor to perform various functions described herein. In some cases, the memory 825 may contain, among other things, a basic input/output system (BIOS) which may control basic hardware or software operation such as the interaction with peripheral components or devices.

The processor 830 may include an intelligent hardware device, (e.g., a general-purpose processor, a DSP, a central processing unit (CPU), a microcontroller, an ASIC, a field programmable gate array (FPGA), a programmable logic device, a discrete gate or transistor logic component, a discrete hardware component, or any combination thereof). In some cases, the processor 830 may be configured to operate a memory array using a memory controller. In other cases, a memory controller may be integrated into the processor 930. The processor 830 may be configured to execute computer-readable instructions stored in a memory 825 to perform various functions (e.g., functions or tasks supporting gunfire response).

A method of data processing at a gunfire response system is described. The method may include receiving sensor data from one or more sensors monitoring a surrounding environment, identifying gunfire with a processor as described anywhere in this disclosure, generating a threat indication if gunfire is identified, entering a threat mode based on the received threat indication, transmitting the threat indication to emergency responders, turning off the building lights, and disabling light switch inputs.

An apparatus for data processing at a gunfire response system is described. The apparatus may include a processor, memory coupled with the processor, and instructions stored in the memory. The instructions may be executable by the processor to cause the apparatus to receive sensor data from one or more sensors monitoring a surrounding environment, identify gunfire with a processor as described anywhere in this disclosure, generate a threat indication if gunfire is identified, enter a threat mode based on the received threat indication, transmit the threat indication to emergency responders, turn off the building lights; and disable light switch inputs.

A method of data processing at a gunfire response system is described. The method may include powering on the system; connecting the system to a network, receiving sensor data from one or more sensors monitoring a surrounding environment, receiving inputs from a light switch control, identifying gunfire with a processor as described anywhere in this disclosure; transmitting sensor data to a user-interface or dashboard; generating a threat indication if gunfire is identified, entering a threat mode based on the received threat indication, transmitting the threat indication to emergency responders, turning off the building lights, disabling light switch inputs; deterring attackers or threats using available devices, lights, fire alarms, speakers, TVs, and other devices, generating a safest response path; and transmitting escape and response information to user devices and TVs.

A non-transitory computer-readable medium storing code for data processing at a gunfire response system is described. The code may include instructions executable by a processor to power on the system, connect the system to a network, receive sensor data from one or more sensors monitoring a surrounding environment, receive inputs from a light switch control, identify gunfire with a processor as described anywhere in this disclosure, transmit sensor data to a user-interface or dashboard, generate a threat indication if gunfire is identified, enter a threat mode based on the received threat indication; transmit the threat indication to emergency responders, turn off the building lights; disable light switch inputs, deter attackers or threats using available devices, lights, fire alarms, speakers, TVs, and other devices; generate a safest response path, and transmit escape and response information to user devices and TVs.

Some examples of the method, apparatuses, and non-transitory computer-readable medium described herein may further include operations, features, means, or instructions for monitoring an environment by receiving, from one or more sensors, response personnel's movements to discern if they might be incapacitated, disoriented, or in distress, even in the absence of health metrics; identifying, from response personnel's movements, if an officer or responder is immobilized, experiences a sudden change in orientation, or detects certain health parameters; and transmitting any officer's distress or compromised status to a centralized command hub to enable rapid deployment of backup or medical assistance.

Some examples of the method, apparatuses, and non-transitory computer-readable medium described herein may further include operations, features, means, or instructions for monitoring an environment by receiving, from one or more sensors, building occupant movements and profiles; identifying, with video analytics and AI-driven pattern recognition, visible weapons such as guns, knives, or other potential threats in the monitored environment; distinguishing, with AI-driven pattern recognition, typical hostage-taker movements and potential ones to rapidly identify known individuals in a hostage situation; and transmitting the identified threats and hostage-taker movements to a centralized command hub to facilitate effective response.

Some examples of the method, apparatuses, and non-transitory computer-readable medium described herein may further include operations, features, means, or instructions for monitoring an environment by receiving, from one or more sensors, building occupant movements and profiles; calculating the potential "threat level" of targets from AI analyses of posture, movements, and potential carried weapons; categorizing threats on a scale, for example 1-10; and transmitting the threat level to emergency responders to guide in decision-making and help prioritize response strategies. The AI may utilize a combination of neural networks trained on thousands of posture and movement patterns, alongside object recognition algorithms, to classify potential threats.

Some examples of the method, apparatuses, and non-transitory computer-readable medium described herein may further include operations, features, means, or instructions for monitoring an environment, incorporating an AI-driven "Whisper Alert" feature, by receiving, from one or more sensors, voice signals with minimal vocal output to be differentiated from typical ambient noise; detecting heightened emotional distress in voices, aiding in identifying potential hostages or those under duress during a situation; transmitting communication, via a SOS voice command functionality, distress signals or call for backup without manual radio communication, solely through a verbal cues; and transmitting, via a real-time negotiation assistance tool, communication from hostage-takers to a centralized command hub and suggesting potential negotiation strategies or providing insights into the psychological state of the individuals involved.

Some examples of the method, apparatuses, and non-transitory computer-readable medium described herein may further include operations, features, means, or instructions for temper protection by integrating RFID (Radio-Frequency Identification) to the one or more sensors; securing RFID-enabled door locks or other mechanisms to provide enhanced security measures by locking or unlocking based on predetermined criteria; and securing the light controls by allowing access only to designated individuals, such as maintenance personnel, through the recognition of their specific RFID tags.

Some examples of the method, apparatuses, and non-transitory computer-readable medium described herein may further include operations, features, means, or instructions for tamper protection by integrating facial recognition capabilities to the one or more sensors; securing facial recognition enabled door locks or other mechanisms to provide enhanced security measures by locking or unlocking based on predetermined criteria; and securing the light controls by allowing access only to designated individuals, such as maintenance personnel, through the recognition of their face.

Some examples of the method, apparatuses, and non-transitory computer-readable medium described herein may further include operations, features, means, or instructions for tamper protection by integrating biometric authentication mechanisms, ensuring only authorized personnel can access critical functions and data, while immediately alerting to unauthorized access attempts.

Some examples of the method, apparatuses, and non-transitory computer-readable medium described herein may further include operations, features, means, or instructions for integrating an encrypted two-way communication channel, enabling direct communication between occupants and response personnel, ensuring clarity and coordination during interventions.

Some examples of the method, apparatuses, and non-transitory computer-readable medium described herein may further include operations, features, means, or instructions for integrating discreet communication channels, enabling potential hostages to communicate with response personnel without alerting hostage-takers when safe to do so.

Some examples of the method, apparatuses, and non-transitory computer-readable medium described herein may further include operations, features, means, or instructions for interacting with wearable devices including generating tactile alerts, like vibrations, to guide wearers discretely towards safe zones based on threat analysis; transmitting immediate threat notifications or alerts directly to occupants' wearables; and receiving vital health statistics of response personnel, including heart rate, body temperature, and oxygen levels.

Some examples of the method, apparatuses, and non-transitory computer-readable medium described herein may further include operations, features, means, or instructions for accessing a database, enabling response personnel to pull up building blueprints, prior incident reports, or known resident profiles, furthering situational awareness.

Some examples of the method, apparatuses, and non-transitory computer-readable medium described herein may further include operations, features, means, or instructions for accessing external medical databases, enabling immediate access to an officer's, or another occupant's, medical history, allergies, or conditions in the event of an injury, ensuring targeted medical interventions.

Some examples of the method, apparatuses, and non-transitory computer-readable medium described herein may further include operations, features, means, or instructions for receiving, from the one or more sensors, barometric signals to detect rapid changes in air pressure, a phenomenon associated with certain threats, including but not limited to gunshots.

Some examples of the method, apparatuses, and non-transitory computer-readable medium described herein may further include operations, features, means, or instructions for receiving, from the one or more sensors, audio signals of bullet casings dropping or other indicative noises of threat to recognize a threat.

Some examples of the method, apparatuses, and non-transitory computer-readable medium described herein may further include operations, features, means, or instructions for receiving, from the one or more sensors, acoustic signals to rapidly distinguish between different firearm signatures, helping the system differentiate between officer and adversary weapons in real-time.

Some examples of the method, apparatuses, and non-transitory computer-readable medium described herein may further include operations, features, means, or instructions for generating a digital representation of a building by creating a "heat map" based on movement, offering response personnel insights into high-traffic areas, potential points of conflict, or areas where individuals may be hiding or trapped.

Some examples of the method, apparatuses, and non-transitory computer-readable medium described herein may further include operations, features, means, or instructions for generating a digital representation of a building by incorporating LIDAR and a suite of cameras and sensors to facilitate a 3D spatial mapping and image reconstruction of the premises.

Some examples of the method, apparatuses, and non-transitory computer-readable medium described herein may further include operations, features, means, or instructions for receiving infrared and thermal signals from one or more sensors and differentiating between individuals based on body heat patterns to assist in distinguishing potential aggressors from hostages in situations where visual data may be unclear from the one or more sensors.

Some examples of the method, apparatuses, and non-transitory computer-readable medium described herein may further include operations, features, means, or instructions for transmitting real-time data, visual alerts, warnings, and notifications to personal devices, such as mobile phones, smart watches, and VR/XR headsets.

Some examples of the method, apparatuses, and non-transitory computer-readable medium described herein may further include operations, features, means, or instructions for transmitting a real-time live stream functionality to concerned parties or authorities immediately upon threat detection, providing them with instantaneous visual and auditory data from the scene.

Some examples of the method, apparatuses, and non-transitory computer-readable medium described herein may further include operations, features, means, or instructions for transmitting a near-instant replay functionality, enabling security or other responsible personnel to promptly analyze moments leading up to a detected threat.

Some examples of the method, apparatuses, and non-transitory computer-readable medium described herein may further include operations, features, means, or instructions for generating a real-time situational awareness module to furnish response personnel with live data including environmental conditions, number of detected occupants, and locations of potential threats.

Some examples of the method, apparatuses, and non-transitory computer-readable medium described herein may further include operations, features, means, or instructions for generating, via an AI module, automated emergency response paths, factoring in the number of occupants, their profiles, and the identified threat to optimize survival rates.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative block and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a digital signal processor (DSP) and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

For purposes of this description and meaning of the claims, the term "memory" means a tangible data storage device, including non-volatile memories (such as flash memory and the like) and volatile memories (such as dynamic random-access memory and the like). The computer instructions either permanently or temporarily reside in the memory, along with other information such as data, virtual mappings, operating systems, applications, and the like that are accessed by a computer processor to perform the desired functionality. The term "memory" or "storage medium" expressly does not include a transitory medium such as a carrier signal, but the computer instructions can be transferred to the memory wirelessly.

The above specification, examples, and data provide a complete description of the structure and use of exemplary implementations of the invention. Since many implementations of the invention can be made without departing from the spirit and scope of the invention, the invention resides in the claims hereinafter appended. Furthermore, structural features of the different implementations may be combined in yet another implementation without departing from the recited claims. While embodiments and applications of this invention have been shown, and described, it would be apparent to those skilled in the art having the benefit of this disclosure that many more modifications than mentioned above are possible without departing from the inventive concepts herein. The invention, therefore, is not to be restricted except in the spirit of the appended claims.

The embodiments of the disclosure are drafted such that various different embodiments may be combined as set forth, for example, in the multiple dependency of the claims that follow. Every combination of embodiments that is grammatically, mathematically, and logically consistent is contemplated. The skilled person may identify one or more combinations of embodiments that are unfeasible, and the existence of any such unfeasible combination shall not limit any combination of embodiments that the skilled person would identify as feasible in light of this disclosure.

The methods described in this disclosure include examples of implementations, and the operations and the steps may be rearranged or otherwise modified such that other implementations are possible. In some examples, aspects from two or more of the methods may be combined. For example, aspects of each of the methods may include steps or aspects of the other methods, or other steps or techniques described herein. Thus, aspects of the disclosure may provide for consumer preference.

The description set forth herein describes example configurations and does not represent all the examples that may be implemented or that are within the scope of the claims. The detailed description includes specific details for the purpose of providing an understanding of the described techniques. These techniques, however, may be practiced without these specific details.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A light switch system configured to respond to gunfire, comprising:
    a base unit that includes:
        a light switch housing configured for installation in a wall of a building;
        an actuator configured to switch one or more building lights on and off; and
        an actuator circuit configured to transmit actuator signals from the actuator;
    one or more sensors to detect one or both of (i) gunfire light and other light and (ii) gunfire sound and other sound;
    one or more sensor circuits configured to transmit one or more sensor signals from the one or more sensors; and
    a controller with a standby mode and a threat mode in communication with the one or more building lights and configured to:
        receive the actuator signals that are transmitted by the actuator circuit from the actuator;
        receive one or more sensor signals that are transmitted by the one or more sensor circuits from the one or more sensors;
        differentiate between the one or both of (i) gunfire light and other light and (ii) gunfire sound and other sound based on the sensor signals;
        control whether the one or more building lights are switched on or off responsive to differentiating between the one or both of (i) gunfire light and other light and (ii) gunfire sound and other sound;
        switch the one or more building lights on and off in response to the actuator signals when the controller is in the standby mode;
        identify gunfire;
        enter the threat mode when the controller identifies gunfire;
        switch the one or more building lights off when the controller enters the threat mode; and remain unresponsive to the actuator signals when the controller is in the threat mode such that the controller will not switch on the one or more building lights when the controller is in the threat mode.

2. The light switch system of claim 1, wherein the one or more sensors are an infrared sensor that is configured to sense gunfire infrared light and other infrared light.

3. The light switch system of claim 2, wherein the controller is configured to differentiate between the gunfire infrared light and the other infrared light.

4. The light switch system of claim 1, wherein the one or more sensors are a microphone that is configured to sense sound.

5. The light switch system of claim 4, wherein the controller is configured to (i) differentiate between the gunfire sound and the other sound, and optionally (ii) count of a number of shots of the gunfire, and optionally (iii) identify a location of the gunfire, and optionally (iv) identify a type of gun that produced the gunfire.

6. The light switch system of claim 1, wherein:
the base unit includes an indicator light configured to emit a caution color or an alert color in communication with the controller; and
the controller is configured to:
identify whether gunfire occurs at an immediate location;
enter the threat mode responsive to identifying gunfire; and
cause the indicator light to change from a caution color to an alert color responsive to entering the threat mode.

7. The light switch system of claim 1, wherein the controller is configured to activate a camera when the controller enters the threat mode, and the camera is configured to transmit a video signal to the controller when the camera is activated.

8. The light switch system of claim 7, further comprising:
a system processing unit in communication with the controller configured to:
record the video signal to create recorded video when the controller is in the threat mode; and
transmit the video signal and the recorded video to emergency responders when the controller is in the threat mode.

9. The light switch system of claim 1, further comprising:
a microphone configured to transmit an audio signal;
a system processing unit in communication with the controller configured to:
record the audio signal to create recorded audio when the controller is in the threat mode; and
transmit the audio signal and the recorded audio to emergency responders when the controller is in the threat mode.

10. The light switch system of claim 1, further comprising:
one or more additional base units wherein each additional base unit includes a light switch housing, actuators, actuator circuits, sensors, sensor circuits, and controllers that are substantially similar to the light switch housing, actuator, actuator circuit, one or more sensors, one or more sensor circuits, and controller of the base unit; and
a system processing unit in communication with the controller of each base unit and configured to:
transmit a threat signal to the controller of each base unit when any controller identifies gunfire such that every controller enters the threat mode when any controller identifies gunfire; and
notify emergency responders when any controller identifies gunfire.

11. The light switch system of claim 10, wherein the controller of each base unit switches off one or more building lights that each controller controls when any controller identifies gunfire.

12. An emergency response system, comprising:
a light switch system including:
a base unit that includes:
a light switch housing;
an actuator configured to switch one or more building lights on and off; and
an actuator circuit configured to transmit actuator signals from the actuator;
one or more sensors configured to detect one or both of (i) gunfire light and other light and (ii) gunfire sound and other sound;
one or more sensor circuits configured to transmit one or more sensor signals from the one or more sensors; and
a controller with a standby mode and a threat mode in communication with the one or more building lights and configured to:
receive the actuator signals that are transmitted by the actuator circuit from the actuator;
receive one or more sensor signals that are transmitted by the one or more sensor circuits from the one or more sensors;
control the one or more building lights on and off in response to the actuator signals when the controller is in the standby mode;
identify gunfire;
enter the threat mode when the controller identifies gunfire;
differentiate between the one or both of (i) gunfire light and other light and (ii) gunfire sound and other sound;
control whether the one or more building lights are switched on or off responsive to differentiating between the one or both of (i) gunfire light and other light and (ii) gunfire sound and other sound;
switch the one or more building lights off when the controller enters the threat mode; and
remain unresponsive to the actuator signals when the controller is in the threat mode such that the controller will not switch on the one or more building lights when the controller is in the threat mode.

* * * * *